Oct. 22, 1929.  H. ISLER  1,733,094
CENTERLESS GRINDER
Original Filed April 20, 1925  4 Sheets-Sheet 1

Inventor
Herman Isler
By H. K. Parsons
Attorney

Oct. 22, 1929.  H. ISLER  1,733,094
CENTERLESS GRINDER
Original Filed April 20, 1925   4 Sheets-Sheet 4

Inventor
Herman Isler
By A. K. Parsons
Attorney

Patented Oct. 22, 1929

1,733,094

UNITED STATES PATENT OFFICE

HERMAN ISLER, OF CINCINNATI, OHIO, ASSIGNOR TO THE CINCINNATI MILLING MACHINE COMPANY, OF CINCINNATI, OHIO, A CORPORATION OF OHIO

CENTERLESS GRINDER

Application filed April 20, 1925, Serial No. 24,477. Renewed July 25, 1929.

This invention relates to improvements in grinding machinery and more particularly to what is commonly termed "centerless grinders".

In the centerless grinding there are two ordinary methods of producing work pieces of circular shape in cross section. One of these is known as the "through feed" method in which the work passes axially from one side of the machine to the other during the grinding operation. The other form is that disclosed in the present invention in which the work is suitably introduced at one side of the machine and subsequently removed from the machine in the same direction as that in which it was introduced.

It will be understood that this form of grinding is particularly adaptable for taper, shoulder and similar forms of work pieces which, on account of their form can not be continuously passed through the machine, but must depend for final configuration on the shape of the grinding and regulating wheels of the machines or the particular manner in which the work is held between such wheels.

One disadvantage attendant upon this form of grinding has been the time lost in feeding and ejecting the work pieces. An object of the present invention, therefore, is to provide a mechanism which shall be automatic in operation and which will insure a rapid feed and ejection of the work piece, thus reducing to a minimum the loss of grinding time during the operation of the machine.

A further object of the present invention is the provision of a machine which will utilize to a maximum the forces of gravity which shall thus make it possible to reduce to a minimum the mechanism required for effecting the feed and ejection operations.

In the attainment of these objects, the invention in its broad aspect comprises a feed member for successively introducing work pieces within the grinding throat of a centerless grinding machine coupled with means for subsequently ejecting the finished work.

In a more specific aspect, the invention includes means for controlling and limiting the feed of a single work piece and means for synchronizing the operation of the feed and ejection mechanism in properly timed sequence.

Further features of novelty in the construction and the advantages attendant thereon should be apparent by reference to the following specifications taken in connection with the accompanying drawings, forming a part thereof, and it will be understood that I may make any modifications in the specific details of construction or combination and arrangement of parts hereinafter disclosed within the scope of the appended claims without departing from or exceeding the spirit of the invention.

In the drawings in which similar characters of reference are employed to denote corresponding parts throughout the several views, the letter A designates the bed of a commercial type centerless grinder having mounted thereon the oscillating slide B for the suitably driven grinding wheel C. In addition there is mounted on the bed an angled slide D in turn serving to support the regulating wheel unit E which on account of the angle of slide D is in tilted relation to the plane of movement of the slide B for the grinding wheel. This unit has mounted thereon a regulating wheel F disposed in opposition to the grinding wheel C so that the parts form therebetween a work receiving throat as at 12. The parts just described are of well known commercial form, the grinding wheel C being driven downwardly at the work throat as indicated by the arrow thereon and the regulating wheel surface being moved upwardly at the work throat. The grinding wheel is operated at a suitable grinding surface speed preferably over 4000 feet per minute, while the regulating wheel surface moves at a slow rate, such as 80–100 feet per minute, with the result that the grinding wheel serves to remove material from a work piece while the regulating wheel controls the speed of rotation thereof. In addition, due to the fact that the rotation axis of the regulating wheel is inclined with respect to the grinding wheel on account of the tilt of unit E, the regulating wheel will exert a feed component urging the work toward the right in the several views shown.

Adjusting screw member G is carried by bracket H on the bed and connected with unit E. On account of the intermediate location of slide D which may be locked either to bed A or unit E, this slide may move with unit E when locked thereto or unit E moved relative to the slide when the slide is locked to bed. The inner portion of slide D is provided with a bracket or support portion 13 disposed beneath grinding throat 12. This support carries the work feed and ejection mechanism hereinafter more fully described.

Figure 7:
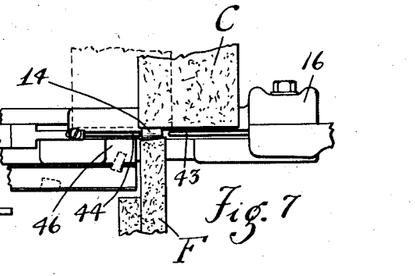
Fig. 7—is a fragmentary plan view.
Figure 8:
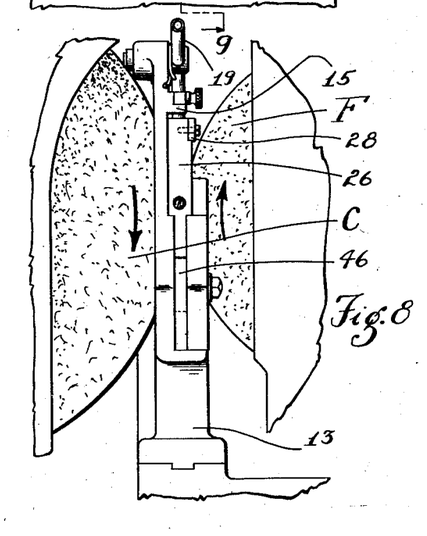
Fig. 8—is an enlarged front view.
Figure 9:
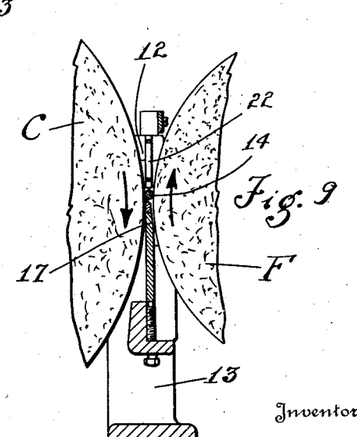
Fig. 9—is a sectional view taken as on the line 9—9 of Fig. 6.

As previously mentioned, the machine in question is intended for taper or other formed work and as shown the grinding wheel C has a plain transverse peripheral face while the regulating wheel F has a face of double the taper which is to be imparted to the work pieces 14 which are shown in the form of rolls of the kind ordinarily utilized in roller bearings. To preserve the shape of the face of the grinding wheel and secure best grinding results, conventional mechanism is employed to impart a reciprocating movement to the grinding wheel during operation as is indicated by the dotted lines in Fig. 7.

This movement makes its possible to use a wide wheel surface and one which can be employed for a longer period without retruing as its oscillation tends to wear it off equally throughout its width.

Figure 1:
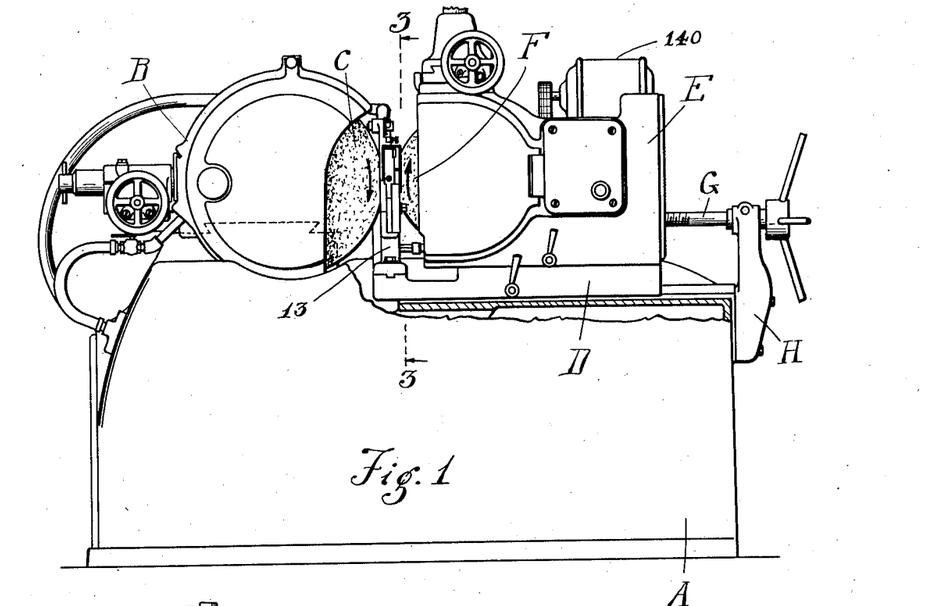
Fig. 1—represents a front view of a machine equipped with my improvements.
Figure 2:
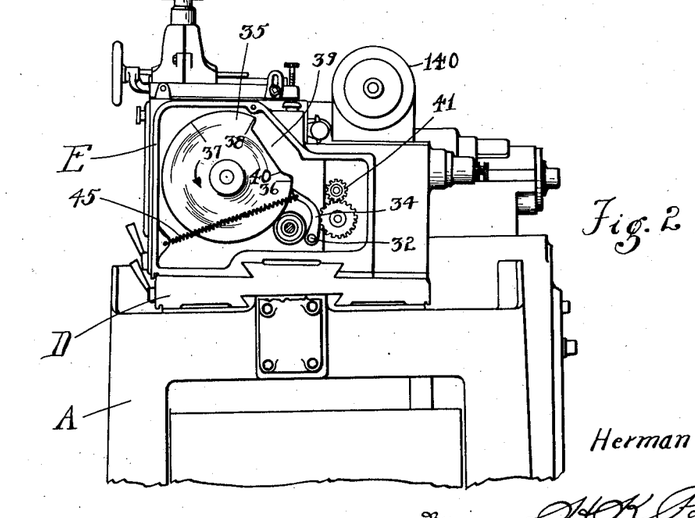
Fig. 2—is an end view thereof with cover plate removed and adjusting screw and bracket broken away.
Figures 3, 4:
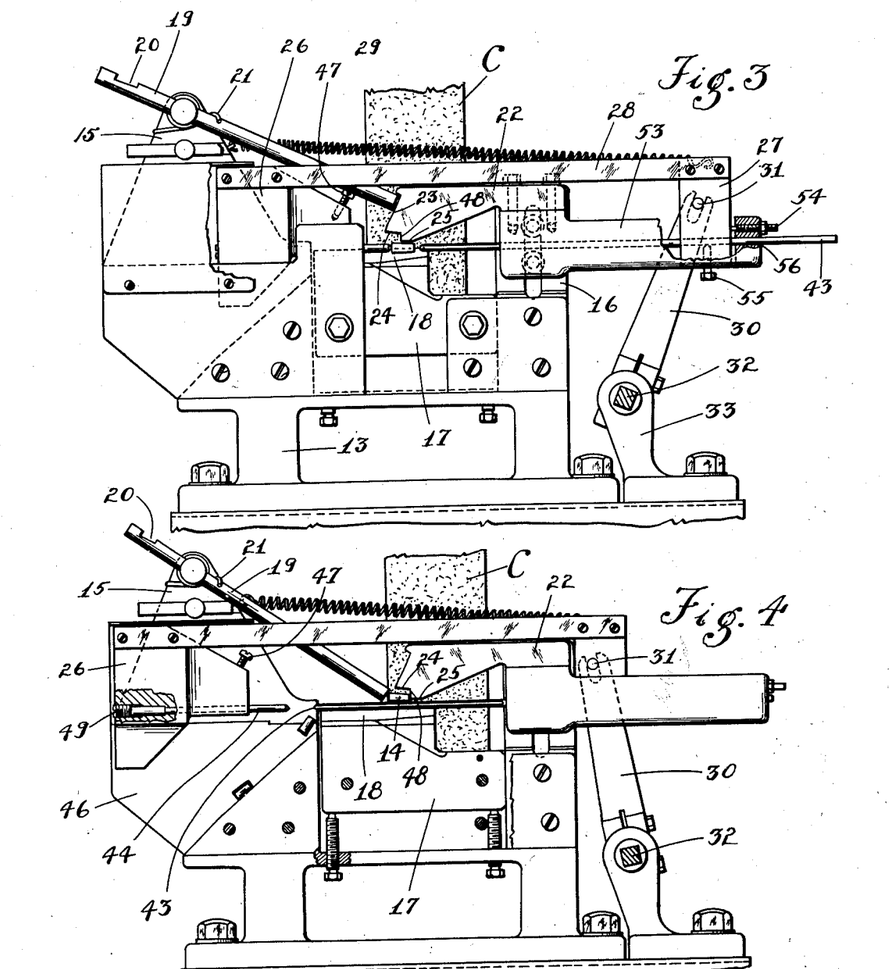
Fig. 3—represents a transverse sectional view with the work rest of the machine and associate parts in elevation, taken as on the line 3—3 of Fig. 1.
Fig. 4—represents a view similar to Fig. 3, showing the parts in work delivery and ejecting position.

Mounted upon the basal support 13, is the front bracket 15 and rear bracket 16 of the work supporting mechanism, while disposed intermediate and connecting said parts is the work rest 17, having a bevelled portion 18 projecting into the grinding throat to support the work therein during the grinding operation. At its upper end bracket 15 has pivoted thereto the feed chute 19 shown in the form of a tube having a work receiving notch 20 so shaped that work pieces may be introduced to the tube only with their smaller end directed inwardly, this restriction being imparted by the lesser width of the inner portion of the work receiving aperture. A suitable spring 21 bears against the bracket and tube to urge the tube downward into work feeding position as shown in Fig. 4.

Ti limit discharge of work pieces from lower end of tube, bracket 16 is provided with the work engaging member 22 having an inclined portion 23 normally forming a closure for the lower end of the feed tube 19, having a cut away portion or recess 24 into which a work piece may move, which is of size to receive a single work piece when the tube swings into feeding position out of engagement with retaining portion 23. Member 22 is additionally supplied with a portion 25, overlying the operative portion of work rest 18 to prevent upward movement of the work piece relative to the rest during the grinding operation.

To control the feed and discharge of the work pieces 14, the members 15 and 16 jointly serve to support the cross slide mechanism which includes the slide blocks 26 and 27 and the connecting bar 28; these parts being urged outwardly or into an ejecting position as by the coil spring 29, having one end secured to block 27 and the opposite end suitably attached to bracket 15.

This slide mechanism may be actuated in any suitable manner, but as here shown is shifted by means of a rock arm 30, having pin and slot connection as 31, with slide block 27. This arm is secured on rock shaft 32, journalled in supporting bracket 33 and provided at its opposite end with dog 34. This dog rides in engagement with cam 35, which has a gradual rise as between points 36 and 37, a dwell as between points 37 and 38, and a dog releasing ejection notch as at 39. This cam is driven from the regulating wheel motor or source of power 140, by suitable mechanism including the change gears 41 and therefore operates in predetermined timed relation to the movement of the regulating wheel so that there will be a stroke of the work controlling slide bar 28 for a predetermined amount of rotation imparted to the work piece by the rotating movement of the regulating wheel.

The beginning of a feed and ejection stroke may be considered as at point 40 when the dog 34 starts to engage the rise between 40 and 36 and receives a rather abrupt movement toward the right, imparting a corresponding movement to arm 30 and the slide mechanism. This shifts the parts from the position of discharge shown in Fig. 4 to an intermediate position of the feed stroke when the space between the proximate ends of members 43 and 44 subtends recess 24. The work piece is then urged by gravity into this space, lying on the work rest partially within the grinding throat.

Continued rotation of the cam in the direction indicated by the arrow thereon causes a slow movement of dog 34 and thus of arm 30 toward the right. The general position of the parts at the beginning of the feeding movement is shown in Fig. 4 by reference to which it will be noted that spring 21 has swung feed tube 19 down to a position where the lowermost work piece or roll 14 will slide into the recess below retaining shoulder 24 and resting on the ejector rod 43. The first quick movement of the dog just described shifts the bar 28 and associate parts back to a position where the work piece may drop down between ejector 43 and follower pin 44 and rest on the inclined work rest or support 18; being then within the forward or wider portion of the grinding throat between the grinding and regulating wheels. Continued rotation of the cam, on account of the gradual slope from 36 to 37 will gradually shift the bar 28 to the right, pin 44 engaging the forward or larger end of the work piece and forcibly moving or pushing it into grinding position within the throat. It will be noted that on account of the angle of the regulating wheel this wheel will exert a feeding tendency to shift the work toward the right but the feed movement caused by the cam is greater than the normal feed movement so that the work piece is forced into the grinding throat with a positive pressure. There is then a slight dwell or non-feeding movement as the cam moves from 37 to 38, thus allowing the work to remain in the grinding throat to receive a final finishing cut after the stock removing cut during the infeed operation, after which the dog snaps down by the shoulder at 38 toward point 40 under influence of spring 45 on the dog and spring 29 on the bar 28. This serves to resiliently strike and force forwardly the work piece, the parts moving again to the position shown in Fig. 4, when the force of gravity will cause the work piece to drop down into the ejecting chute 46.

It will be noted that the slide block 26 is provided with the adjustable screw stop or contact member 47 for engagement with tube 19. In normal or grinding position this screw holds the tube swung upward about its pivot so that portion 23 of the work engaging member 22 forms a closure for the lower end of the tube and prevents escape of the work pieces therein. As the block is forwardly moved on the ejecting stroke this screw recedes from engagement with the tube so that it may move downward and allow gravity to force out the lowermost work piece as shown in Fig. 4. In this position the movement of the lowermost work piece is limited by shoulder 48 on member 22 and the work piece itself in turn serves to hold back the other pieces in the feed tube so that but a single one escapes. As the screw 47 engages the tube on reverse or feeding movement it springs same upward, the lowermost work piece riding on the closure face 23 as previously described.

From the foregoing, the cyclic action of the machine should be readily understood and it will be noted that utilization is made of the force of gravity to move the work piece downward, first, through the discharge chute, thence from the discharge chute into engagement with a temporary work detaining member and from engagement with the said member onto the work rest for the grinding action. Also it will be seen that subsequent to the grinding and on the ejection stroke, use is again made of direct gravitational force withdrawing the work from the feed and ejection members into the discharge trough.

Figure 5:
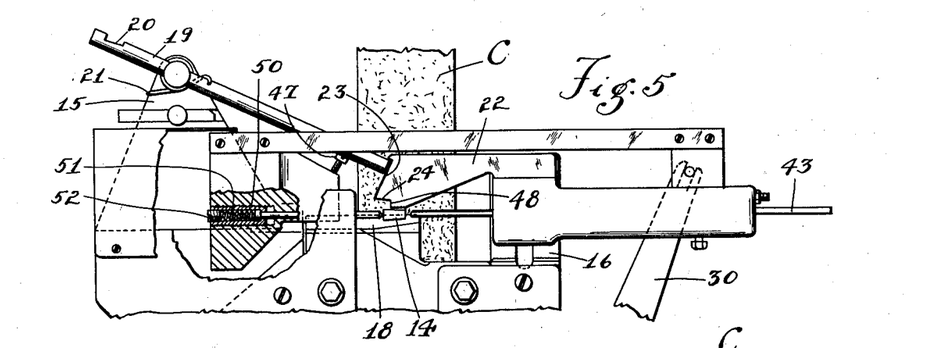
Fig. 5—represents a view similar to Fig. 3 of slightly modified construction.
Figure 6:
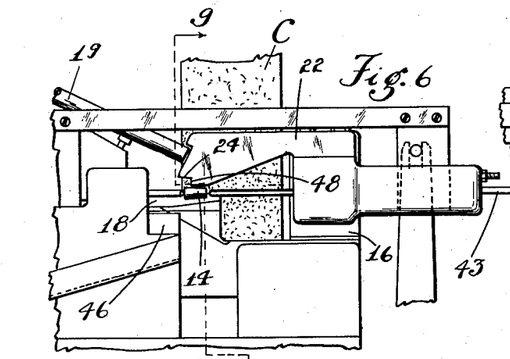
Fig. 6—is a similar view of a short stroke type machine.

The foregoing covers the general operation of the machine and the structural details common to the several forms illustrated. Certain possible modifications as to relationship of the parts have been respectively indicated in Figures 4, 5 and 6. In Fig. 4 the feeding in pin 44 has been shown as provided with a screw threaded portion 49 engaged in a suitable socket in the slide block 27 so that it is rigidly but adjustably supported in position for engagement with the work piece. As an alternative to this, in Fig. 5, the member has been shown in the form of a headed pin whose innermost position may be varied by in and out threading of stop sleeve 50 but in place of being rigidly held within the block it is resiliently urged into feed position by spring 51 adjustably retained within the sleeve by plug 52. In this form, therefore, the work following pin yieldably engages and presses the work between the wheels to the final position determined by inter-engagement of its head with the inner end of the sleeve 50; this position being varied by in and out screwing of said sleeve. This form is in some respects the most desirable as it gives both a resilient action with positive limitation in the infeed movement, together with a resiliently or yieldingly ejection action thus reducing to a minimum liablity of breakage or damage of the work piece or parts of the machine during the reciprocation of the work controlling members. The structure shown in Figures 6 and 7 differs from that of Figures 3 and 4 for example, in that the amount of stroke imparted to bar 28 and associate parts is considerably reduced, since the upper end of work ejection trough 46 is immediately adjacent the inlet position of the work. In this form the weight of the following pieces in the feed tube 19 serves to urge the lowermost work piece as ejected from the tube into position within the grinding throat, while dropping down into the trough is prevented by pin 43 projecting therebeneath. On the other hand, an ejection or a slight forward movement of the parts serves to bring the work piece into alignment with the upper end of the ejector trough so that a stroke of but little more than double the length of the work piece itself is required for the feed and ejection movement in place of a stroke of several times that length as indicated in previous views.

It will be noted that there is a double limitation for the forcible inward feeding movement of the work due to the fact that the position of feeding pin 44 in the several forms may be adjustably varied while in addition support 53 on member 16 is provided with adjustable stop 54 projecting into the path of movement of slide block 27 and thus positively limiting the movement of the slide mechanism as an entirety in the feeding direction. It will also be noted that the exact engagement of the ejector member with the work piece may be varied inasmuch as said member is slidably engaged in slide block 27 and adjustably locked in position therein by set screw 55, said member projecting outward from the passage 56 in member 53 and serving therefor as a guide for the movement of the slide block.

Figure 10:
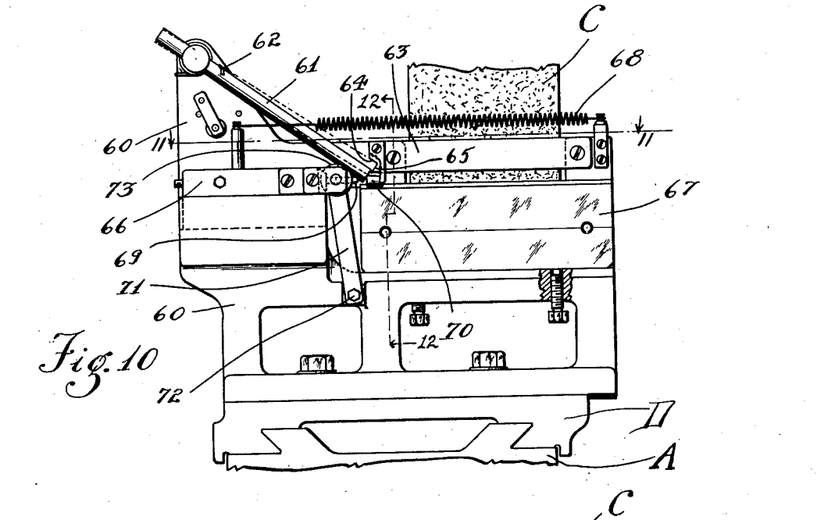
Figure 10 is a transverse view of another embodiment of the invention.
Figures 11, 12:
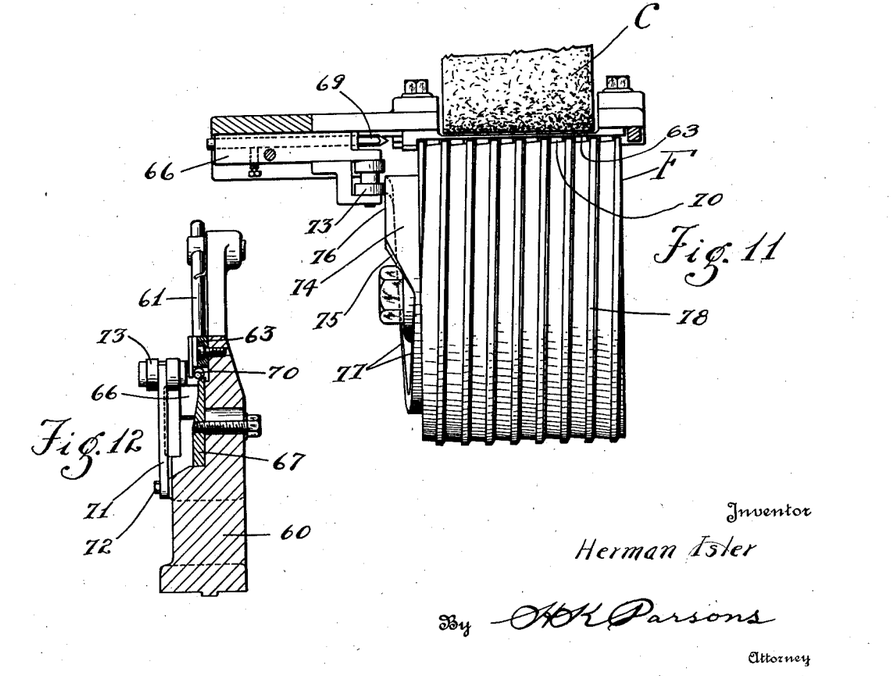
Figure 11 is a plan view showing parts in cross section as on line 11—11 of Figure 10.
Figure 12 is a fragmentary vertical sectional view as on the line 12—12 of Figure 10.

In the form of invention shown in Figures 10 and 11 use is made of the principles hereinbefore described but with a slightly modified arrangement. In this form the bed of the machine supports the bracket member 60 to which is pivoted the feed tube 61 downwardly actuated by spring 62 similar to the parts 19 and 21 of Figure 3 for example. Disposed adjacent the lower end of feed tube 61 and within the grinding throat is the stop plate 63 having the recess 64 normally receiving the lower end of the tube and the wall 65 forming a work-retaining closure therefor. A reciprocable slide 66 is supported by bracket 60 in a position just above the work-rest 67. This slide is actuated toward the right as by spring 68 and has the feed plunger portion 69 for pushing a work-piece 70 into the grinding throat.

To control reciprocation of the slide use is made of the lever 71 pivoted to the lower portion of bracket 60 as at 72 and having its upper end interengaged with the slide. This upper end bears a roller 73 in contact with cam 74 secured to the regulating wheel "F" or the spindle therefor. This cam as indicated in Figure 11 has an abrupt rise as at 75, an intermediate dwell as at 76 and a gradually receding portion 77. This form is particularly adapted for use in conjunction with what is known as a spiral feeding wheel or wheel having a positive helical rib for guiding the work, this rib being indicated at 78 on the regulating wheel. In this form the rib serves as a progressively receding limit stop for the movement of the work and the cam is designed to correspond with the recession of the rib.

In operation, the portion 75 of the cam will engage roller 73 forcing same to the left as shown in Figure 10 withdrawing plunger 69 and thus relieving tube 61 of the retaining pressure of the wedge-like control abutment allowing the tube to swing downward in the same manner that the tube 19 of Figure 4 is depressed. This downward swinging movement allows the lowermost work-piece 70 to slide from the end of tube 61 into contact with guide rib 78 of wheel "F". As the cam rotates beyond the dwell 76 so that the roller 73 begins to engage the receding portion 77 thereof, spring 68 will shift slide 66 to the right. This action causes abutment 69' to engage and raise guide tube 61 while at the same time the feed plunger 69 projecting forwardly beneath the lower end of the tube yieldingly engages the end of work-piece 70 to press it to the right into close contact with the face of rib 78, exerting a continuous follow-up pressure until the work-piece has entered practically entirely within helical groove forming by the convolutions of the rib. As this takes place in substantially a turn of the feed wheel, the rise 75 of the cam will then just be in position to impart a rapid reverse movement to lever 73 and associated parts allowing the tube to spring down for ejection of a new work-piece when the operation is repeated.

It will therefore be seen that this form of the construction embodies the same principles of operation as those previously described in the employment of the spring actuated feed tube, the retaining plate, and the force feed for the work-piece. Also the action of the control cam is similar, except that the control cam in this form is disposed directly upon the feed wheel in place of being separately located and driven, while the work feeds thru and therefore a separate ejector member is not required. It is to be understood, however, that the cam control mechanism just described could be employed with equal facility with the infeed and ejection form of apparatus shown in the other views of the invention and that its use is not limited to employment with the specific feed wheel mechanism illustrated.

I claim:

1. A centerless grinder including opposed grinding and regulating wheels forming a work receiving throat therebetween, a work rest disposed within the throat, and work feed and ejection mechanism associated with the rest, said mechanism including a transversely reciprocable member having independent means for moving the work into and out of operative position within the throat, means for positively actuating the parts to move the work into operative position and means for resiliently reversely actuating said parts.

2. A centerless grinder including opposed grinding and regulating wheels forming a work receiving throat therebetween, a work support and a work positioning member disposed within the throat in fixed spaced relation each to the other, and a slide mechanism including means for terminally engaging one end of the work for forcing it into operative position within the grinding throat, a resilient support for said means, means for adjusting the position of the support and thus of the work engaging means, and additional means for subsequently engaging the opposite end of the work for ejecting same from the grinding throat.

3. A centerless grinder including opposed grinding and regulating wheels forming a work receiving throat therebetween, a work rest disposed within the throat, and a work positioning member disposed within the throat above the work rest and having a recess adapted to receive a work piece and an additional portion adapted to overlie and position the work piece when it is moved from the recess into grinding position within the throat.

4. A mechanism of the character described including means providing a grinding throat, a work supplying member mounted for swinging movement adjacent the throat, work feed and ejection mechanisms movable within the throat, and means for alternately moving the work supplying member into and out of feed position in timed relation to the in and out movements of the work feed member.

5. A mechanism of the character described including means providing a work grinding throat, a work rest projecting into said throat, a work supplying member pivotally mounted adjacent the throat, a reciprocating feed and ejection mechanism movable transversely of the grinding throat, means associated with said mechanism for moving the work supplying member into and out of discharge position on reciprocation of the feed and ejection mechanism, and means normally forming a closure for the discharge end of the work supplying member.

6. A mechanism of the character described including means providing a work grinding throat, a work rest disposed within the throat, a work supply tube pivotally mounted adjacent the throat and having a terminal portion adapted to discharge work into the throat, and a work position controlling member overhanging the work rest within the throat, said member having a portion normally forming a closure for the discharge end of the work supply tube, having a portion forming a work receiving recess adjacent the work rest, and an additional portion overhanging the work rest for preventing upward movement of the work in the throat during the grinding operation.

7. A mechanism of the character described including opposed grinding and regulating members forming a work receiving throat therebetween, a work rest projecting within the throat, a bracket disposed adjacent the throat and bearing a work positioning member overhanging the work rest in spaced relation thereto, said member having a work detaining portion, a work receiving recess and a work positioning portion overhanging the work rest within the grinding throat, a slide member having a portion also supported by the bracket and a work ejecting member carried by the slide and having a portion adapted to underlie the work receiving recess of said member when in ejecting position.

8. A mechanism of the character described including opposed grinding and regulating members forming a work receiving throat therebetween, a work rest projecting within the throat, a bracket disposed adjacent the throat and bearing a work positioning member overhanging the work rest in spaced relation thereto, said member having a work detaining portion, a work receiving recess and a work positioning portion overhanging the work rest within the grinding throat, a slide member having a portion also supported by the bracket, and a work ejecting member carried by the slide and having a portion adapted to underlie the work receiving recess of said member when in ejecting position, said slide being further provided with a work pressing member spaced from the ejector to receive a work piece therebetween, the wall of the recess preventing movement of the work piece with the ejector on which it rests whereby gravity will cause the work piece to move downward into the space between the work following and ejecting devices for operative positioning thereof.

9. A centerless grinder including opposed grinding and regulating members forming a work receiving throat therebetween, a work rest projecting within the throat, a bracket rising adjacent the throat and bearing a work position controlling member including a work detaining portion and a work receiving recess, a feed member movably supported adjacent said work position controlling member, a work feed and ejecting slide movable transversely of the grinding throat, and means associated with said slide for controlling the movement of the work feeding member from alignment with the work detaining portion of the controlling member to alignment with the work receiving recess therein, substantially as and for the purpose described.

10. A mechanism of the character described including opposed grinding and regulating members forming a work receiving throat, a work rest disposed within the throat, automatic mechanism for successively feeding work pieces into the throat, means for positively actuating the work pieces into operative position within the throat and additional means for yieldingly ejecting the pieces from the grinding throat.

11. A centerless grinder including a grinding wheel operable at a grinding speed and an opposed regulating wheel having its operative surface moving in the opposite direction to the direction of movement of the operative portion of the grinding wheel and at a much slower rate, a work rest projecting into the grinding throat between said parts, a bracket member disposed adjacent the parts and bearing a pivotally mounted feed tube, means for resiliently swinging the tube into feeding position, and combined work positioning and ejecting mechanism including a reciprocating slide and means on the slide for normally holding the tube in raised position to prevent discharge of work pieces therefrom.

12. A centerless grinder including a grinding wheel operable at a grinding speed and an opposed regulating wheel having its operative surface moving in the opposite direction to the direction of movement of the operative portion of the grinding wheel and at a much slower rate, a work rest projecting into the grinding throat between said parts, a bracket member disposed adjacent the parts and bearing a pivotally mounted feed tube, means for resiliently swinging the tube into feeding position, and combined work positioning and ejecting mechanism including a reciprocating slide and means on the slide for normally holding the tube in raised position to prevent discharge of work pieces therefrom, a work controlling member extending into the grinding throat in spaced relation to the work rest and having a portion cooperating with the tube in raised position to provide a closure for the discharge end thereof and having a recess adjacent the work rest adapted to receive a single work piece when the tube is in work discharging position.

13. A device of the character described including opposed grinding and regulating members forming a work receiving throat therebetween, a work rest disposed within the throat, work feeding mechanism including a reciprocable slide, and an adjustable pressure device carried by the slide for forcibly moving the work into the grinding throat.

14. A device of the character described including opposed grinding and regulating members forming a work receiving throat therebetween, a work rest disposed within the throat, work feeding mechanism including a reciprocable slide, and an adjustable pressure device carried by the slide for forcibly moving the work into the grinding throat, and additional yieldably actuated mechanism for shifting the work out of the grinding throat.

15. A centerless grinder including opposed grinding and regulating members forming a work receiving throat therebetween, a work rest within the throat, work feeding mechanism, a work ejecting mechanism movable transversely of the grinding throat above the work rest, said mechanism including a plunger adapted to alternately laterally engage a work piece to support same prior to its introduction into the grinding throat and subsequently terminally engage the work piece to eject same from the grinding throat.

16. A centerless grinder including opposed grinding and regulating members forming a work receiving throat therebetween, a work rest disposed within the throat, means for introducing work into the grinding throat transversely thereof and for subsequently ejecting ground work pieces, said means including a reciprocable slide, an actuating arm therefor, a cam controlling the movement of the arm, means for actuating said cam in timed relation to the rotation of the regulating wheel, a work feeding member disposed adjacent the grinding throat, and means on the slide for shifting the feeding member into and out of work discharging position.

17. A centerless grinder including opposed grinding and regulating members forming a work receiving throat therebetween, a work rest within the throat, and reciprocating members for moving work into and out of the grinding throat, means disposed above said parts for utiliziing gravity to feed work on to the work rest between said parts, and additional means disposed beneath said parts for receiving discharged work pieces.

18. In a machine of the character described the combination with means providing a grinding throat, of means vertically supplying work to said throat, means for laterally shifting supplied work into and out of grinding position, and vertically extending means for receiving the work from the grinding throat.

19. In a mechanism of the character described the combination with a reciprocable work controlling slide, of an adjustably mounted follower pin carried by the slide for moving work into operative position and means for securing the pin in longitudinally adjusted position as respects its slide.

20. In a device of the character described the combination of means providing a work receiving throat, a reciprocable slide having feed and ejection members for controlling the position of the work within the throat, said feed and ejection members each being adjustable with respect to the stroke of the slide to vary their engagement with the work piece as respects a given position of the slide.

21. In a device of the character described the combination with means providing a work receiving throat, of a reciprocable slide having feed and ejection members for controlling the position of the work within the throat, said feed and ejection members each being adjustable with respect to the stroke of the slide to vary their engagement with the work piece as respects a given position of the slide and adjustable means for limiting the movement of the slide and parts carried thereby.

22. A device of the character described including means providing a work receiving throat, a work rest disposed within the throat, cam controlled means for positively shifting the work to predetermined position within the grinding throat and yieldingly actuated means for subsequently ejecting the work from the grinding throat.

23. A machine of the character described including opposed grinding and regulating wheels forming a work-receiving throat therebetween, a workrest disposed within the throat, and means for supplying work to the grinding throat including a reciprocable work-feeding slide and means controlled by the reciprocations thereof, for individually supplying work-pieces into the path of the movement of the feed slide, said latter means including a shiftable magazine, resilient means urging the magazine into discharge position and a shifting member on the slide for controlling the movement of the magazine into and out of work discharging position.

24. A machine of the character described including opposed grinding and regulating wheels forming a work-receiving throat therebetween, a workrest within the throat, a plate overhanging the rest and a feed tube movably mounted adjacent said parts, the discharge end of said tube being movable from a position in alignment with the plate to a position adjacent the workrest whereby the plate will form a closure for the discharge end thereof when in one position.

25. A machine of the character described including opposed grinding and regulating wheels forming a work-receiving throat therebetween, a workrest within the throat, a plate overhanging the rest and a feed tube movably mounted adjacent said parts, the discharge end of said tube being movable from a position in alignment with the plate to a position adjacent the workrest whereby the plate will form a closure for the discharge end thereof when in one position, a reciprocable slide adjacent said tube, and means on the slide engaging the tube to control the movement thereof.

26. A machine of the character described including opposed grinding and regulating wheels forming a work-receiving throat therebetween, a workrest within the throat, a plate overhanging the rest and a feed tube movably mounted adjacent said parts, the discharge end of said tube being movable from a position in alignment with the plate to a position adjacent the workrest whereby the plate will form a closure for the discharge end thereof when in one position, a reciprocable slide adjacent said tube, and means on the slide engaging the tube to control the movement thereof, said slide having a plunger portion for engaging a work-piece discharged from the tube to urge said workpiece laterally of the workrest.

27. A machine of the character described including opposed grinding and regulating wheels forming a work-receiving throat therebetween, a workrest within the throat, a plate overhanging the rest and a feed tube movably mounted adjacent said parts, the discharge end of said tube being movable from a position in alignment with the plate to a position adjacent the workrest whereby the plate will form a closure for the discharge end thereof when in one position, a reciprocable slide adjacent said tube, and means on the slide engaging the tube to control the movement thereof, said slide having a plunger portion for engaging a work-piece discharged from the tube to urge said workpiece laterally of the workrest, and means for imparting a reciprocating movement to the slide in predetermined timed relation to the rotation of the regulating wheel.

28. The combination with a centerless grinder, including opposed grinding and regulating wheels and an intermediate work rest, of a work feeding device for cooperation with the work rest, including a slide, a yieldably mounted work positioning pin carried by the slide, means for limiting the movement of the pin relative to the slide, and an adjustable support for said means whereby the initial position of the pin relative the slide may be varied as desired.

29. A centerless grinder of the character described, including opposed grinding and regulating wheels and an intermediate work rest, means for positioning work on the work rest, including a work controlling slide having a work shifting pin, means for positively urging the slide and pin into the grinding throat between the grinding and regulating wheels, and means yieldingly supporting the pin relative to the slide to limit the pressure applicable through the pin on movement of the slide.

30. A centerless grinder of the character described, including opposed grinding and regulating wheels and an intermediate work rest, means for positioning work on the work rest, including a work controlling slide having a work shifting pin, means for positively urging the slide and pin into the grinding throat between the grinding and regulating wheels, means yieldingly supporting the pin relative to the slide to limit the pressure applicable through the pin on movement of the slide, and means for variably controlling the yielding pressure of the pin.

31. A centerless grinder of the character described, including opposed grinding and regulating wheels and an intermediate work rest, means for positioning work on the work rest, including a work controlling slide having a work shifting pin, means for positively urging the slide and pin into the grinding throat between the grinding and regulating wheels, means yieldingly supporting the pin relative to the slide to limit the pressure applicable through the pin on movement of the slide, and means for varying the initial position of the pin and its yielding support with respect to the slide.

HERMAN ISLER.